United States Patent
Franklin et al.

(10) Patent No.: US 6,271,486 B1
(45) Date of Patent: *Aug. 7, 2001

(54) WEIGHING MACHINES

(75) Inventors: Kenneth Winston Franklin, Warwickshire; Robert Bennett, Pelsall, both of (GB)

(73) Assignee: Ishida Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,191

(22) PCT Filed: Oct. 15, 1996

(86) PCT No.: PCT/GB96/02511

§ 371 Date: Jul. 17, 1998

§ 102(e) Date: Jul. 17, 1998

(87) PCT Pub. No.: WO97/14938

PCT Pub. Date: Apr. 24, 1997

(30) Foreign Application Priority Data

Oct. 17, 1995 (GB) ................................................ 9521252

(51) Int. Cl.$^7$ ........................... G01G 13/18; G01G 13/16
(52) U.S. Cl. ..................... 177/105; 177/108; 177/109; 251/212; 222/503
(58) Field of Search ................................. 177/105, 106, 177/107, 108, 109, 110, 111, 112, 113, 25.18; 251/212; 222/502, 503

(56) References Cited

U.S. PATENT DOCUMENTS

| 898,689 | * | 9/1908 | Sawyer .................................. 251/212 |
| 2,748,998 | * | 6/1956 | Busald .................................. 251/212 |
| 4,703,874 | * | 11/1987 | Tapperman et al. .................. 222/503 |
| 5,340,949 | * | 8/1994 | Fujimura et al. .................. 177/25.18 |
| 5,379,923 | * | 1/1995 | Sagastegui et al. .................. 222/503 |
| 5,767,453 | * | 6/1998 | Wakou et al. .................... 177/25.18 |
| 5,806,725 | * | 9/1998 | Bennett .................................. 222/503 |
| 5,895,678 | * | 4/1999 | Sunter .................................. 426/289 |
| 6,051,070 | * | 4/2000 | Sunter .................................. 222/503 |

OTHER PUBLICATIONS

U.S. application No. 08/727,675, Bennett, filed Oct. 17, 1996.
U.S. application No. 08/791,315, Sunter, filed Jan. 30, 1997.

* cited by examiner

*Primary Examiner*—Randy W. Gibson
(74) *Attorney, Agent, or Firm*—Staas & Halsey LLP

(57) ABSTRACT

A hopper for a weighing machine which has a tubular body and a closing valve which is comprised of several plates which are pivotably mounted around the bottom of the hopper for movement in a plane transverse to the axis of the hopper. The plates are simultaneously driven between open and closed positions by a common belt or chain so that the closing forces of the plates are balanced. The belt is coupled to a driving mechanism through a lever mounted on the hopper which disconnects from the driving mechanism when the plates are fully closed so that the hopper is freely suspended for weighing purposes. The plates scrape against the bottom of the hopper when opening so that material clinging to the plates is scraped off.

13 Claims, 4 Drawing Sheets

WEIGHING MACHINES

The present invention relates to weighing machines.

Multi-head weighing machines comprise a number of hoppers to which a free flowing product may be fed by suitable means. The feed means is arranged to deliver quantities of the product to the hoppers each quantity being approximately a fraction (¼ or ⅓) of the desired target weight. The hoppers are connected to strain gauges or load cells by which the weights of their contents may be accurately measured. A combination of hoppers is then selected which when aggregated come closest to the desired target weight. The select hoppers are then discharged into a common chute to form the target weight.

Hitherto, hoppers used in such multi-head weighing machines have been closed at their lower ends by means of a pair of doors pivoted about horizontal axes and spring loaded towards one another to a closed position. A lever mechanism is provided to pivot the doors downwardly to an open position. The lever mechanism is controlled by an abutment member which is moved into engagement with the lever mechanism to open the doors. In the closed position, the abutment member is positioned clear of the lever mechanism, so that the hopper will be suspended freely for weighing purposes.

The hoppers used hitherto have several disadvantages. In particular, the complex linkage mechanism required to open and close the doors and the relatively large surface area of the doors. Furthermore, the product may stick to the pivoted doors, so that the full batch of product is not delivered to the discharge chute.

According to one aspect of the present invention a weighing machine includes at least one hopper, said hopper having a tubular body with closing means located adjacent its lower end, the closing means selectively opening and closing the lower end of the tubular body, said closing means comprising a plurality of plates pivotally mounted for movement in the plane transverse to the axis of the tubular body between; a closed position, in which the plates engage one another generally centrally of the bore of the tubular body; and an open position, in which the plates are disposed clear of the bore of the tubular body; and means being provided to drive the plates between their open and closed positions.

In accordance with the present invention, the surface areas of the plates is significantly less than that of the hopper doors used in existing designs and the mechanical linkages are simplified.

Furthermore, as the plates move transverse to the tubular body of the hopper, they may be arranged such that the side walls defining the tubular body will scrape the product off the plates, so that the full batch of product is transferred to the discharge chute.

According to a preferred embodiment of the present invention the plates of the closing means are arranged symmetrically of the tubular body, movement of the plates being such that the forces generated in the plane of movement will be balanced.

According to a further preferred embodiment the plates of the closing means are driven by a belt or chain, in reciprocating manner, through a drive pulley or sprocket. The drive pulley or sprocket is preferably driven by an external power source, the external power source being disengaged from the drive pulley or sprocket when the plates are in their closed position so that the hopper will be freely suspended for weighing purposes.

An embodiment of the invention is now described, by way of example only, with reference to the accompanying drawings in which.

Figure 1:
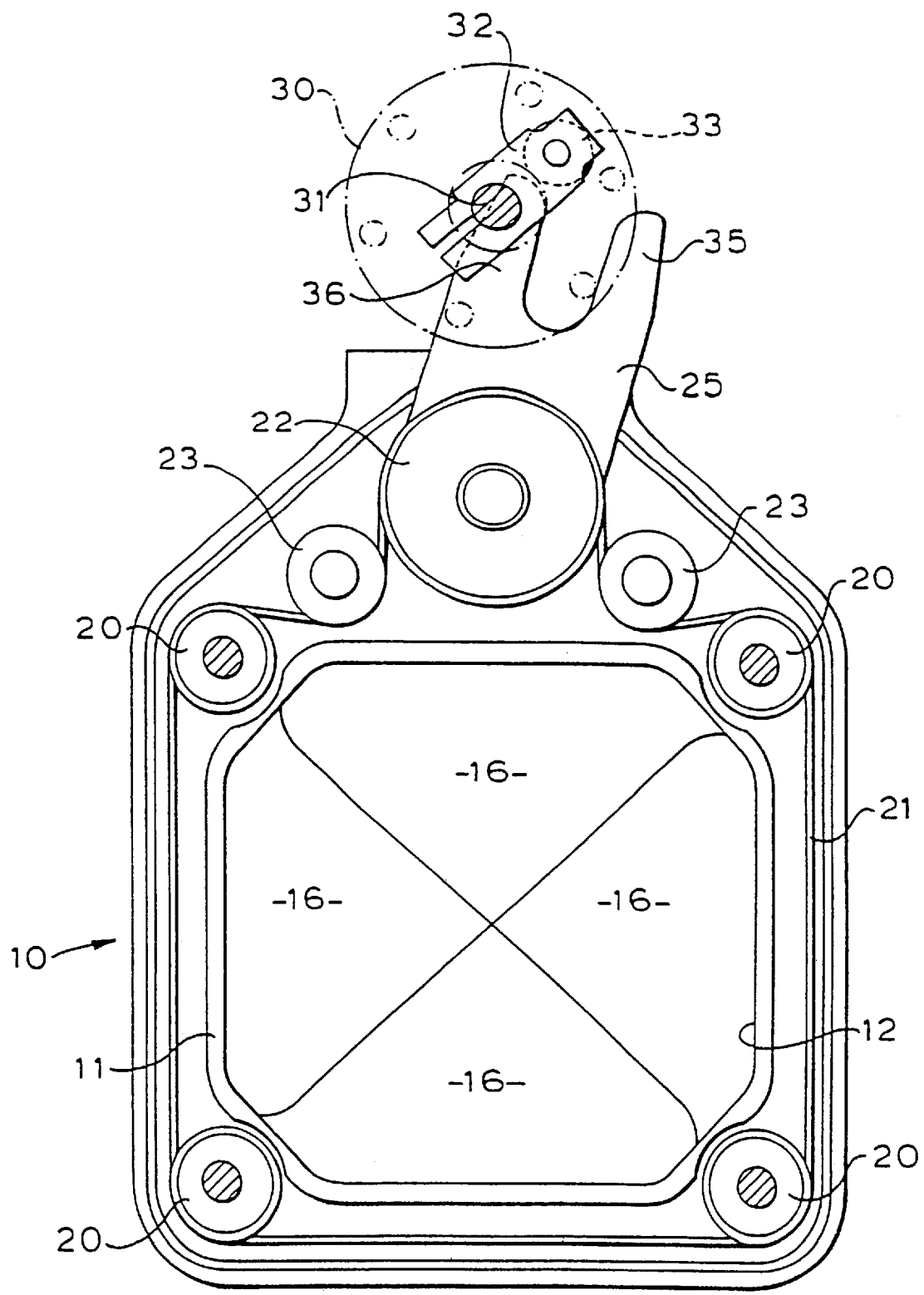
FIG. 1 is a sectional plan view of a hopper of a weighing machine in accordance with the present invention.

As illustrated in FIG. 1, a hopper 10 comprises a tubular body 11 which defines a bore 12 of generally square section.

Figure 2:
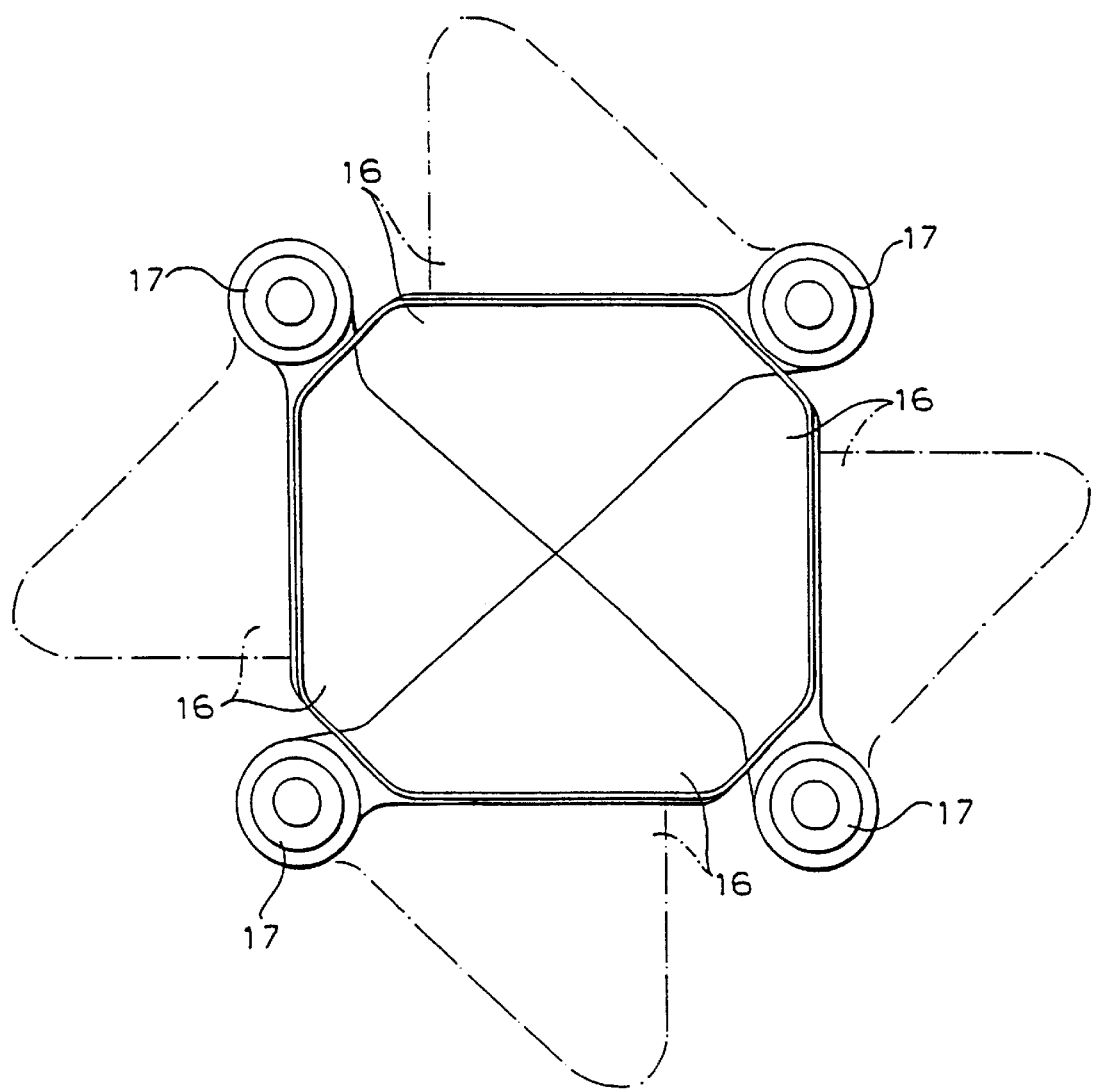
FIG. 2 is a plan view of the closure means of the hopper illustrated in FIG. 1.

Closure means 15 is located adjacent the lower end of the body 11. As illustrated in greater detail in FIG. 2, the closure means 15 comprises four plates 16 which are mounted by means of bearing 17 to the body member 11, for rotation about axes parallel to the axis of the body member 11. The plates 16 are of generally triangular shape and are movable between: a closed position (as illustrated in full line in FIG. 2) in which the plates 16 engage one another centrally of the bore 12 to close the bore 12; and an open position (as illustrated in broken line) in which the plates 16 are disposed clear of the bore 12.

Figure 3:
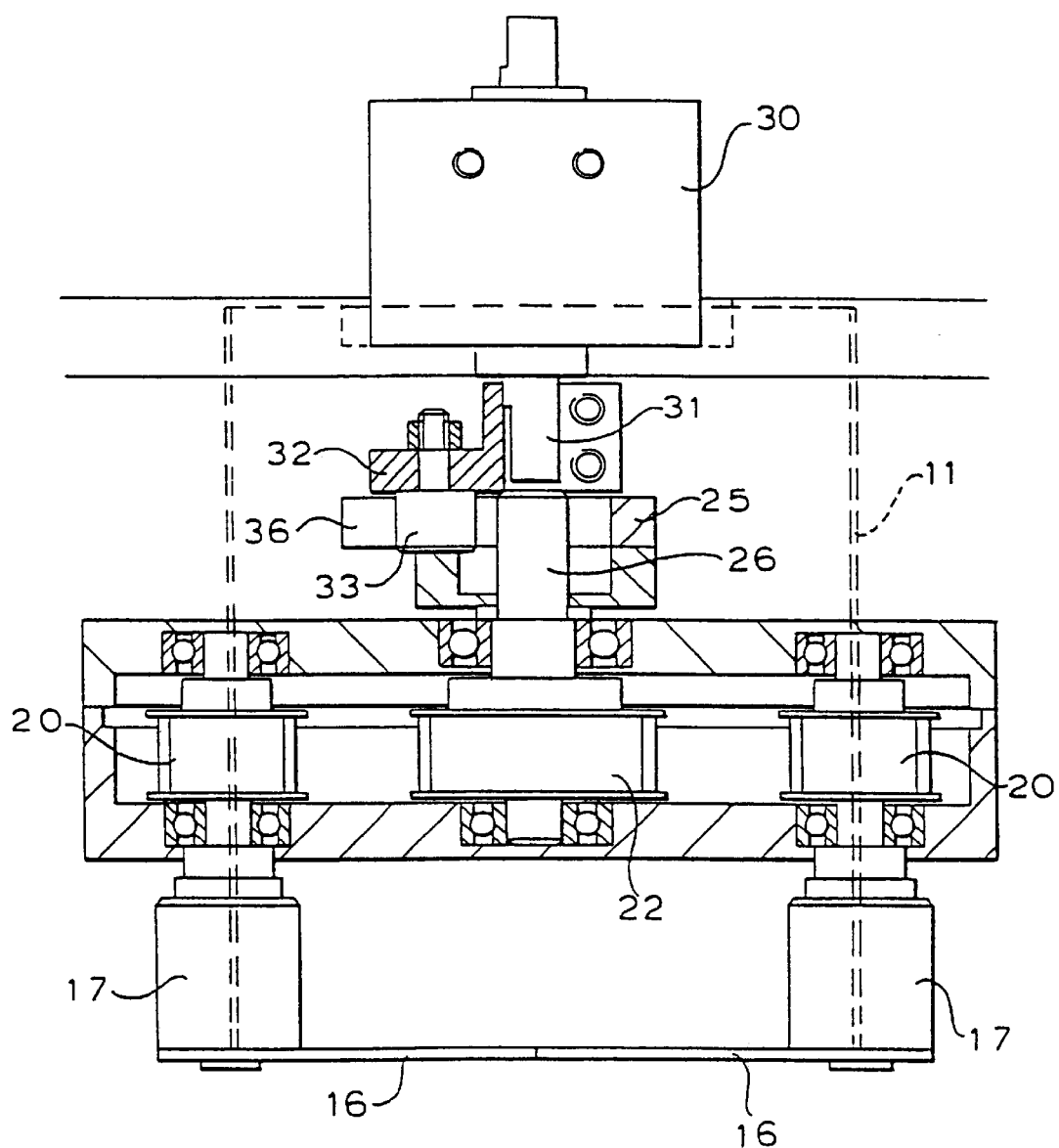
FIG. 3 is a sectional front elevation of the hopper illustrated in FIG. 1.

The plates 16 are disposed adjacent the lower end of the tubular body 11 (as illustrated in FIG. 3). The walls of the tubular body 11 are disposed close to the upper surfaces of the plates 16 so that they will sweep the upper surfaces of the plates 16 as the plates 16 are moved from their closed to their open position. Toothed pulleys 20 are drivingly connected to each of the plates 16. A toothed belt 21 engages the pulleys 20 and a toothed drive pulley 22 mounted for rotation in a common plane with the pulleys 20. Idler rollers 23 tension the belt 21 and maintain it in driving engagement with the pulleys 20 and drive pulley 22. A bifurcated lever 25 is drivingly connected to the drive pulley 22 by shaft 26.

A pneumatic rotary cylinder 30 is mounted in juxtaposed relationship to the body 11. The cylinder 30 drives a shaft 31 which is disposed parallel to shaft 26. An arm 32 is mounted on shaft 31 for rotation therewith and a roller 33 is mounted on the arm 32 for rotation about an axis parallel to but spaced from the axis of shaft 31. The pneumatic rotary cylinder 30 is arranged to drive the shaft 31 in reciprocating manner through 270°.

As illustrated in FIG. 3, the arm 32 is disposed such that the roller 33 will be moved by the cylinder 30 in the plane of movement of the lever 25.

Figure 4:
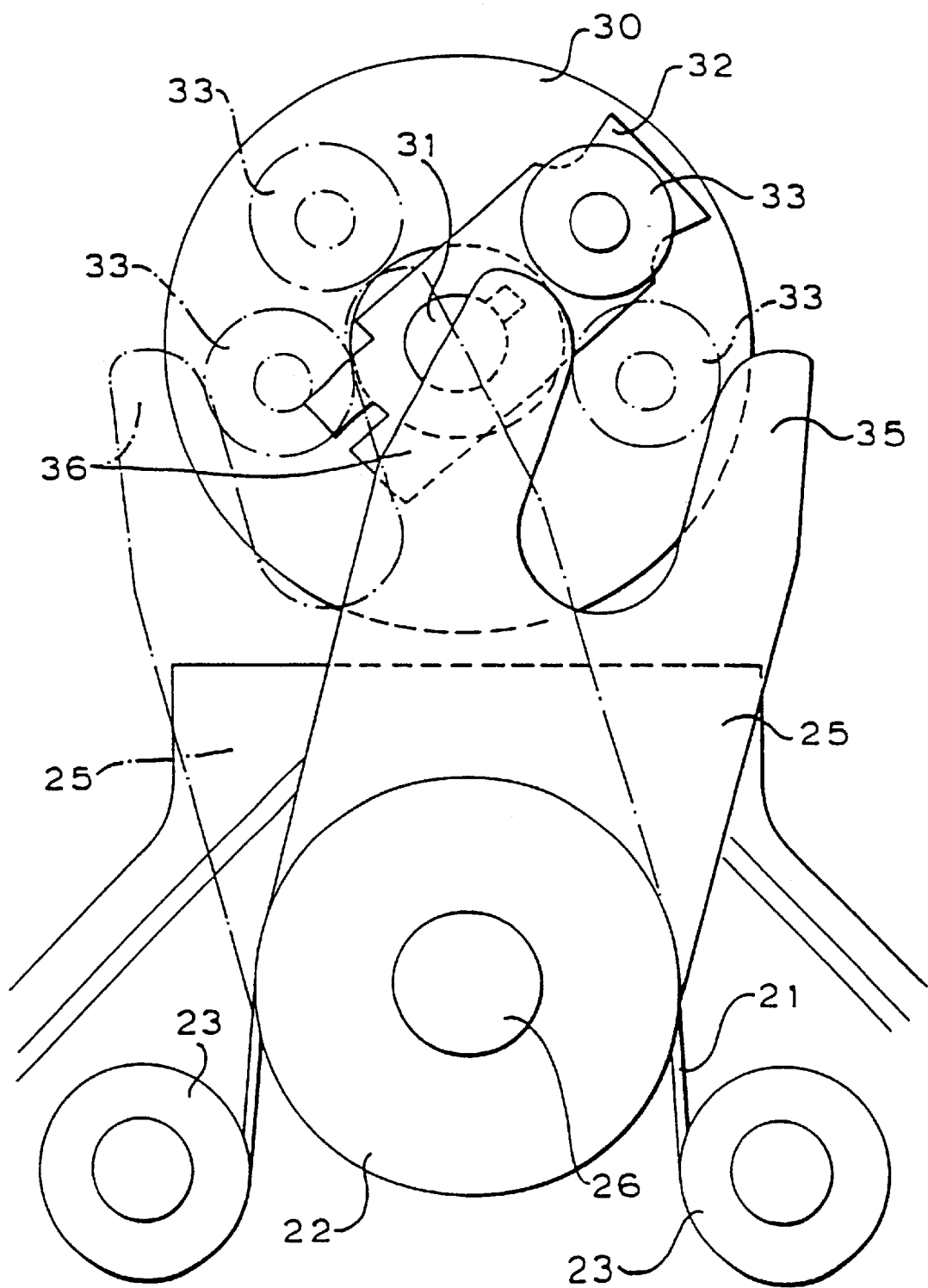
FIG. 4 is a detail of the drive mechanism of the hopper illustrated in FIG. 1, illustrating its operation.

As illustrated in FIG. 4, at one limit of movement of the cylinder 30 the roller is clear of lever 25 and the plates 16 are in their closed position. When cylinder 30 is actuated and the roller 33 is rotated on arm 32, the roller 33 will engage between the limbs 35, 36 of the bifurcated portion of lever 25 and will rotate the lever 25 and drive pulley 22 connected thereto. Movement of the drive pulley 22 will drive the belt 21 and thus the pulleys 20, to rotate the plates 16. After the plates have moved through 45° to the open position, the roller 33 disengages from lever 25 and completes its rotation to its opposite limit of movement. The cylinder 30 may then be reversed to move the plates 16 from their open to their closed position, reversing the movement described above.

It will be appreciated that in the above embodiment the toothed belt 21 and pulleys 20 and 22 may be replaced by a chain and sprockets.

The hopper described with reference to the accompanying drawings is particularly suitable for use in a multi-head weighing machine where a plurality of the hoppers will be arranged with common feed means, by which approximately metered batches of product may be delivered to the hoppers; each hopper is mounted on a strain or load cell by which the content of the hopper may be accurately weighed; and a common discharge chute is provided into which the contents of the hoppers may be selectively discharge.

Alternatively, the hopper may be used individually on a weighing machine.

What is claimed is:

1. A weighing machine comprising:

a weighing device;

a hopper suspended from the weighing device and having a tubular body with a body axis, the tubular body having a lower end and a bore;

a closing mechanism located adjacent to the lower end of the tubular body, wherein the closing mechanism selectively opens and closes the lower end of the tubular body, the closing mechanism includes a plurality of plates pivotally mounted for rotation about an axis parallel to the body axis so that each of the plates moves in a substantially same plane transverse to the body axis between a closed position in which the plates engage one another substantially centrally of the bore of the tubular body, and an open position in which the plates are disposed clear of the bore of the tubular body, the plates being arranged symmetrically with respect to the tubular body, the weighing machine includes a driving device which drives the plates between the open and closed positions so that forces generated by movement of the plates will be balanced in said plane, the plates of the closing mechanism are driven by a belt or chain, in a reciprocating manner, through a movement device which is one of the group consisting of a drive pulley and a sprocket, and the movement device is driven by an external power source, the external power source being disengaged from the movement device when the plates are in the closed position so that the hopper will be freely suspended for weighing purposes.

2. A weighing machine as in claim 1, wherein the closing mechanism includes four plates.

3. A weighing machine comprising:

a weighing device;

a hopper suspended from the weighing device and having a tubular body with a body axis, the tubular body having a lower end and a bore;

a closing mechanism located adjacent to the lower end of the tubular body, wherein the closing mechanism selectively opens and closes the lower end of the tubular body, the closing mechanism includes a plurality of plates pivotally mounted for rotation about an axis parallel to the body axis so that each of the plates moves in a substantially same plane transverse to the body axis between a closed position in which the plates engage one another substantially centrally of the bore of the tubular body, and an open position in which the plates are disposed clear of the bore of the tubular body, the plates being arranged symmetrically with respect to the tubular body, the weighing machine includes a driving device which drives the plates between the open and closed positions so that forces generated by movement of the plates will be balanced in said plane, the weighing machine weighs a product which passes through the tubular body to a discharge chute, the plates are arranged such that, as the plates move from the closed to the open position, side walls defining the tubular body will scrape product off the plates, so that a full batch of product is transferred to the discharge chute, the plates of the closing mechanism are driven by a belt or chain, in a reciprocating manner, through a movement device which is one of the group consisting of a drive pulley and a sprocket, and the movement device is driven by an external power source, the external power source being disengaged from the movement device when the plates are in the closed position so that the hopper will be freely suspended for weighing purposes.

4. A weighing machine as in claim 3, wherein the closing mechanism includes four plates.

5. An weighing machine comprising:

a weighing device;

a hopper suspended from the weighing device and having a tubular body, the tubular body having a lower end and a bore;

a closing mechanism located adjacent to the lower end of the tubular body, wherein the closing mechanism selectively opens and closes the lower end of the tubular body, the closing mechanism includes a plurality of plates pivotally mounted for movement in a plane transverse to an axis of the tubular body between a closed position in which the plates engage one another substantially centrally of the bore of the tubular body, and an open position in which the plates are disposed clear of the bore of the tubular body, the plates being arranged symmetrically with respect to the tubular body, the weighing machine includes a driving device which drives the plates between the open and closed positions so that forces generated by movement of the plates will be balanced, the plates of the closing mechanism are driven by a belt or chain, in a reciprocating manner, through a movement device which is one of the group consisting of a drive pulley and a sprocket, and the movement device is driven by an external power source, the external power source being disengaged from the movement device when the plates are in the closed position so that the hopper will be freely suspended for weighing purposes.

6. An weighing machine comprising:

a weighing device;

a hopper suspended from the weighing device and having a tubular body, the tubular body having a lower end and a bore;

a closing mechanism located adjacent to the lower end of the tubular body, wherein the closing mechanism selectively opens and closes the lower end of the tubular body, the closing mechanism includes a plurality of plates pivotally mounted for movement in a plane transverse to an axis of the tubular body between a closed position in which the plates engage one another substantially centrally of the bore of the tubular body, and an open position in which the plates are disposed clear of the bore of the tubular body, the plates being arranged symmetrically with respect to the tubular body, the weighing machine includes a driving device which drives the plates between the open and closed positions so that forces generated by movement of the plates will be balanced, the weighing machine weighs a product which passes through the tubular body to a discharge chute, the plates are arranged such that, as the plates move from the closed to the open position, side walls defining the tubular body will scrape product off the plates, so that a full batch of product is transferred to the discharge chute, the plates of the closing mechanism are driven by a belt or chain, in a reciprocating manner, through a movement device which is one of the group consisting of a drive pulley and a sprocket, and the movement device is driven by an external power source, the external power source being disengaged from the movement device when the plates are in the closed position so that the hopper will be freely suspended for weighing purposes.

7. An weighing machine comprising:

a weighing device weighing a product;

a hopper suspended from the weighing device and having a tubular body with an output end, the product passing through the tubular body along a travel path and through the output end of the tubular body to a discharge area after being weighed by the weighing device; and a plurality of plates pivotally mounted to move between a closed position where the plates engage one another in a substantially central position of the output end of the tubular body to block the product from passing through the output end of the tubular body, and an opened position where the plates are disposed clear of the output end of the tubular body to allow the product to pass through the output end to the discharge area, the plates being symmetrically arranged with respect to the output end of the tubular body and being driven between the opened and closed positions so that forces generated by movement of the plates will be balanced, wherein the plates are driven by a belt or chain, in a reciprocating manner, through a movement device which is one of the group consisting of a drive pulley and a sprocket, and the movement device is driven by an external power source, the external power source being disengaged from the movement device when the plates are in the closed position so that the hopper will be freely suspended for weighing purposes.

8. An apparatus comprising:

a weighing device;

a hopper suspended from the weighing device and having a tubular body, the tubular body having a lower end and a bore;

a plurality of plates pivotally mounted for movement in a plane transverse to an axis of the tubular body between a closed position in which the plates engage one another substantially centrally of the bore of the tubular body to close the lower end of the tubular body, and an open position in which the plates are disposed clear of the bore of the tubular body to open the lower end of the tubular body;

a movement device which is one of the group consisting of a drive pulley and a sprocket driving;

a belt or chain driving the plates, in a reciprocating manner, through the movement device; and an external power source driving the movement device, the external power source disengaged from the movement device when the plates are in the closed position so that the hopper will be freely suspended for weighing purposes.

9. An apparatus comprising:

a weighing device;

a hopper suspended from the weighing device and having a tubular body, the tubular body having a lower end and a bore, the weighing device weighing a product which passes through the tubular body to a discharge chute;

a plurality of plates pivotally mounted for movement in a plane transverse to an axis of the tubular body between a closed position in which the plates engage one another substantially centrally of the bore of the tubular body, and an open position in which the plates are disposed clear of the bore of the tubular body, the plates being arranged such that, as the plates move from the closed to the open position, side walls defining the tubular body scrape product off the plates, so that a full batch of product is transferred to the discharge chute;

a movement device which is one of the group consisting of a drive pulley and a sprocket;

a belt or chain driving the plates, in a reciprocating manner, through the movement device; and an external power source driving the movement device, the external power source disengaged from the movement device when the plates are in the closed position so that the hopper will be freely suspended for weighing purposes.

10. An apparatus comprising:

a weighing device weighing a product;

a hopper suspended from the weighing device and having a tubular body with an output end, the product passing through the tubular body along a travel path and through the output end of the tubular body to a discharge area after being weighed by the weighing device; and a plurality of plates pivotally mounted to move between a closed position where the plates engage one another in a substantially central position of the output end of the tubular body to block the product from passing through the output end of the tubular body, and an opened position where the plates are disposed clear of the output end of the tubular body to allow the product to pass through the output end to the discharge area;

a movement device which is one of the group consisting of a drive pulley and a sprocket;

a belt or chain driving the plates, in a reciprocating manner, through the movement device; and an external power source driving the movement device, the external power source disengaged from the movement device when the plates are in the closed position so that the hopper will be freely suspended for weighing purposes.

11. An apparatus comprising:

a weighing device;

a hopper suspended from the weighing device and having a tubular body, the tubular body having a lower end and a bore;

a plurality of plates pivotally mounted for movement in a plane transverse to an axis of the tubular body between a closed position in which the plates engage one another substantially centrally of the bore of the tubular body to close the lower end of the tubular body, and an open position in which the plates are disposed clear of the bore of the tubular body to open the lower end of the tubular body;

a movement device which is one of the group consisting of a drive pulley and a sprocket driving;

a belt or chain driving the plates, in a reciprocating manner, through the movement device;

driving means, engaging with the movement device, for driving the movement device; and means for disengaging said driving means from the movement device when the plates are in the closed position so that the hopper will be freely suspended for weighing purposes.

12. An apparatus comprising:

a weighing device;

a hopper suspended from the weighing device and having a tubular body, the tubular body having a lower end and a bore, the weighing device weighing a product which passes through the tubular body to a discharge chute;

a plurality of plates pivotally mounted for movement in a plane transverse to an axis of the tubular body between a closed position in which the plates engage one another substantially centrally of the bore of the tubular body, and an open position in which the plates are disposed clear of the bore of the tubular body, the plates being arranged such that, as the plates move from the closed to the open position, side walls defining the tubular body scrape product off the plates, so that a full batch of product is transferred to the discharge chute;

a movement device which is one of the group consisting of a drive pulley and a sprocket;

a belt or chain driving the plates, in a reciprocating manner, through the movement device;

driving means, engaging the movement device, for driving the movement device; and means for disengaging the driving means from the movement device when the plates are in the closed position so that the hopper will be freely suspended for weighing purposes.

13. An apparatus comprising:

a weighing device weighing a product;

a hopper suspended from the weighing device and having a tubular body with an output end, the product passing through the tubular body along a travel path and through the output end of the tubular body to a discharge area after being weighed by the weighing device; and a plurality of plates pivotally mounted to move between a closed position where the plates engage one another in a substantially central position of the output end of the tubular body to block the product from passing through the output end of the tubular body, and an opened position where the plates are disposed clear of the output end of the tubular body to allow the product to pass through the output end to the discharge area;

a movement device which is one of the group consisting of a drive pulley and a sprocket;

a belt or chain driving the plates, in a reciprocating manner, through the movement device;

driving means, engaging the movement device, for driving the movement device; and means for disengaging the driving means from the movement device when the plates are in the closed position so that the hopper will be freely suspended for weighing purposes.

* * * * *